United States Patent [19]

Majus

[11] 3,952,622

[45] Apr. 27, 1976

[54] VICE MOUNTED MULTIPLE-USE BAND SAW WITH DETACHABLE WORK SURFACE

[76] Inventor: Joseph Majus, Box 99, Camp Lake, Wis. 53109

[22] Filed: Aug. 30, 1974

[21] Appl. No.: 502,017

Related U.S. Application Data

[63] Continuation-in-part of Ser. No. 320,094, Jan. 2, 1973, abandoned.

[52] U.S. Cl. .................................... 83/799; 83/811

[51] Int. Cl.$^2$ .................. B23D 53/04; B23D 55/04; B27B 13/04

[58] Field of Search ............ 83/794, 798, 799, 788, 83/811

[56] References Cited

UNITED STATES PATENTS

| | | | |
|---|---|---|---|
| 2,556,670 | 6/1951 | Ashworth | 83/798 |
| 3,815,465 | 6/1974 | Smierciak | 83/799 |

*Primary Examiner*—Donald R. Schran
*Attorney, Agent, or Firm*—Neuman, Williams, Anderson & Olson

[57] ABSTRACT

A multiple-use portable band saw for mounting on a standard work shop type vice. The band saw blade and blade mounting are standard in the art and therefore, not described in detail. The band saw is mounted on a rotatable shaft and can be operated in either a generally vertical table saw position or a generally horizontal tilting saw position. The rotatable shaft forms a portion of the clamping structure which mounts the band saw onto the standard vice. The clamping structure includes a stabilizing tongue memeber to prevent the entire band saw structure from tipping during or after the horizontal cutting operation, a stop means to prevent the downward movement of the band saw beyond a predetermined position and an adjustable arm member to eliminate unwanted movement when the saw is used in either the vertical or horizontal position. In the vertical position, a removable work table is mounted onto the clamping structure itself. The table is positioned and supported by three leg type appendages. Since there are three supporting legs, the size of the work surface can be increased without a reduction in its stability. Also since the three legs are mounted onto the clamping structure itself, no additional frame or supporting structure is required. The saw can also be used apart from the support structure as a hand-held tool.

3 Claims, 6 Drawing Figures

VICE MOUNTED MULTIPLE-USE BAND SAW WITH DETACHABLE WORK SURFACE

This application is a continuation-in-part of application Ser. No. 320,094 filed Jan. 2, 1973, and now abandoned.

DESCRIPTION OF PRIOR ART

Portable hand-held band saws are well-known in the prior art. The basic band saw consists of an elongated frame, a rotatable wheel mounted at each end of the frame, an endless cutting band or saw connected over the wheels, a guide member associated with each wheel for holding the cutting band in the proper plane while the band is cutting a workpiece, and a driving motor for rotating one of the wheels causing the endless cutting band to move over the two wheels. This type of portable band saw is also frequently mounted upon a movable cart or similar device to facilitate transportation to different work areas. The cart also serves as the mounting base for the band saw and as the working surface to position the workpiece during the generally horizontal cutting operation. When a band saw is mounted on this type of portable cart, a surface area of the cart is also commonly provided with a clamp or other similar device for holding the workpiece for cutting in the horizontal position. The band saw which is mounted on a movable cart or table results in a rather large structure which is quite expensive. In addition, band saws may be fixed for cutting in a vertical position. When used in the vertical position, the band saw is provided with a table upon which the workpiece can be held.

Also hand-operated saws have been mounted upon bench vices in the prior art. However, besides being hand operated by a crank arm such prior art devices functioned by having the saw blade move in a direction parallel to the length of the vice. In such an operation, the clamping structure did not have to support the changing effective weight of the saw due to the changing moment arm and center of gravity as the saw was used in a cutting operation. In addition, the saw was usable in only a single position and therefore no structure was needed to provide for operation of the saw in a different mode nor for movement of the saw between different modes of operation without detaching the entire structure from the supporting vice. Thus, while attachment of a simple hand operated reciprocating saw to a bench vice was known to the prior art, the mounting difficulties and stability requirements presented by a multi-position band saw being mounted on a vice were unsolved.

An object of the present invention is to provide a truly portable band saw which is capable of being mounted on a common work shop type vice.

Another object of the present invention is to provide a band saw that is secured to a vice by a clamp structure which provides the dual function of making the band saw stable both during generally horizontal cutting operations and operation as a table saw and serving as a mounting structure for a removable table.

Another object of the invention is to provide a band saw that may function efficiently as a hand-held tool, a table saw and a horizontal saw.

During the horizontal cutting operation, the entire band saw structure is moved into contact with the workpiece and will usually cut the workpiece due to the downward weight of the band saw itself. Therefore, in this type of cutting operation, it is important that the clamping structure provide stability in order to prevent the entire band saw from overturning during the cutting operation. In the vertical cutting position, the workpiece is brought to the band saw blade as opposed to the horizontal cutting operation where the blade is brought to the workpiece. Therefore, another object of the invention is to provide a work table in front of the band saw blade upon which the operator rests the workpiece which is stable and sufficiently large to enable the workpiece to be supported and to support guides such as a rip fence or the like.

BRIEF DESCRIPTION OF THE DRAWINGS

Further and additional objects will appear from the following detailed description of a specific embodiment read in conjunction with the accompanying drawings, wherein.

SUMMARY OF THE INVENTION

The present invention is directed to a multi-use band saw which is mounted on a standard bench vice. When mounted on the bench vice, the band saw is operatable in either a horizontal or table saw cutting mode. When released from the vice and clamp, the saw can be operated as a hand-held tool. The clamping means which fastens the band saw onto the vice serves multiple functions. This clamping structure includes stabilizing means which prevents tipping of the entire band saw during or after the horizontal cutting operation, stop means to prevent excessive downward movement of the band saw beyond a predetermined limit, an adjustable arm to eliminate unwanted movement in either the horizontal or vertical cutting mode, support points for the table brackets, and a known reference for an automatic cut-off switch. Thus, the clamping structure attaches the band saw to the bench vice and provides stability and control during both table and horizontal cutting operations which are uniquely related to the band saw. Second, the clamping structure functions as a supporting frame for the removable table needed during the vertical cutting operation of the band saw. No additional structure is needed to support the table thereby making the entire system truly portable and compact.

DETAILED DESCRIPTION OF THE DRAWINGS

Figure 1:
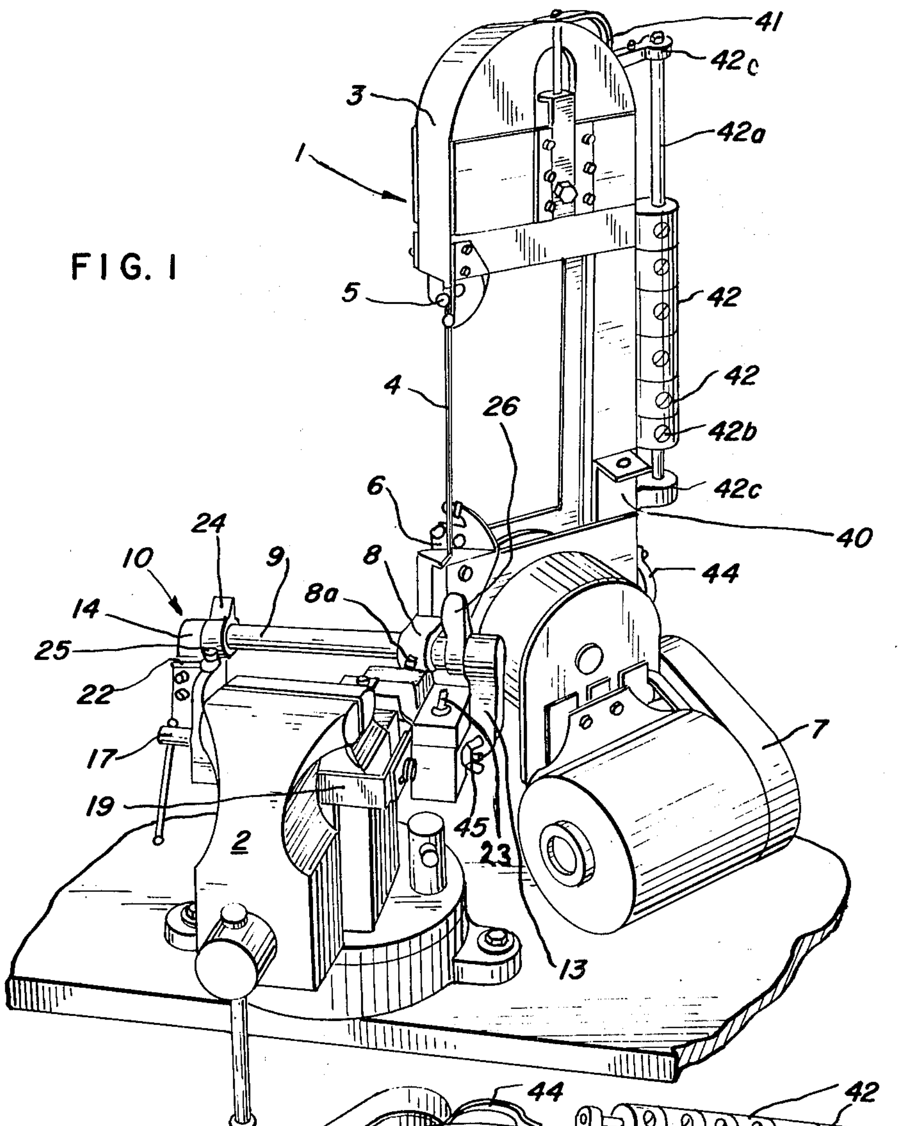
FIG. 1 illustrates the band saw mounted on a vice and in an upright position.
Figure 4:
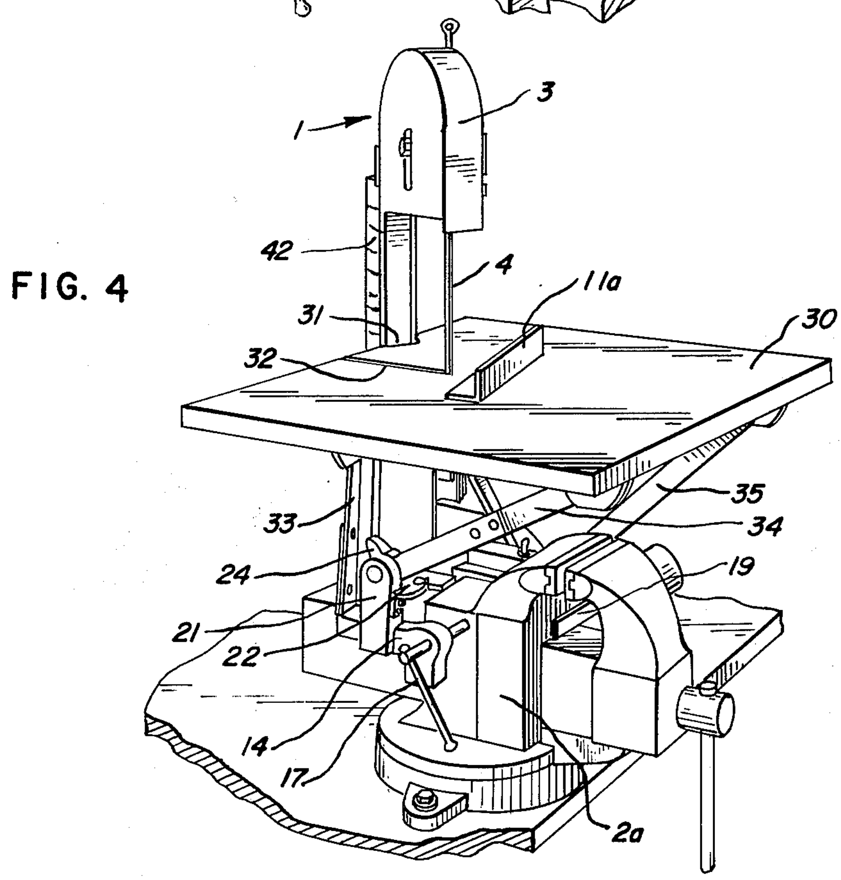
FIG. 4 illustrates the band saw in the vertical or table cutting position with the removable table attached.

In FIG. 1, the band saw 1 is shown in the upright position clamped to one common work shop type vice 2. The basic operation of the band as a saw is well-known in the art, therefore, it is neither described nor shown in detail. The band saw comprises a generally C-shaped frame 3 which houses two rotatable wheels (not shown) over which the band or saw blade 4 is positioned. Guide members 5 and 6 hold the band or cutting blade 4 at the proper angular position. The motor 7 used to power the band saw is mounted on the frame 3. The size of the motor can be varied depending at least in part upon the amount of horsepower required to operate the band saw. Therefore, a large motor, as illustrated, would be for high horsepower commercial type use while a smaller motor would be possible for lower horsepower models. A mounting assembly 8 is connected to the frame 3 of the band saw. The mounting assembly 8 also has a bushing which engages and is rotatably supported on a shaft 9 which is part of a clamp assembly 10. The mounting assembly 8 is connected to the frame 3 by bolts and nuts (not shown) or in any other well-known manner. The shaft 9 fits through an aperture provided in the mounting assembly 8 and is locked in place by set-bolt 8*a*. In this upright position, the band saw 1 can be adapted for either table or tilting cutting operations. The table saw operation is illustrated at FIG. 4 and the horizontal or tilting cutting operation is illustrated at FIG. 2.

Figure 2:
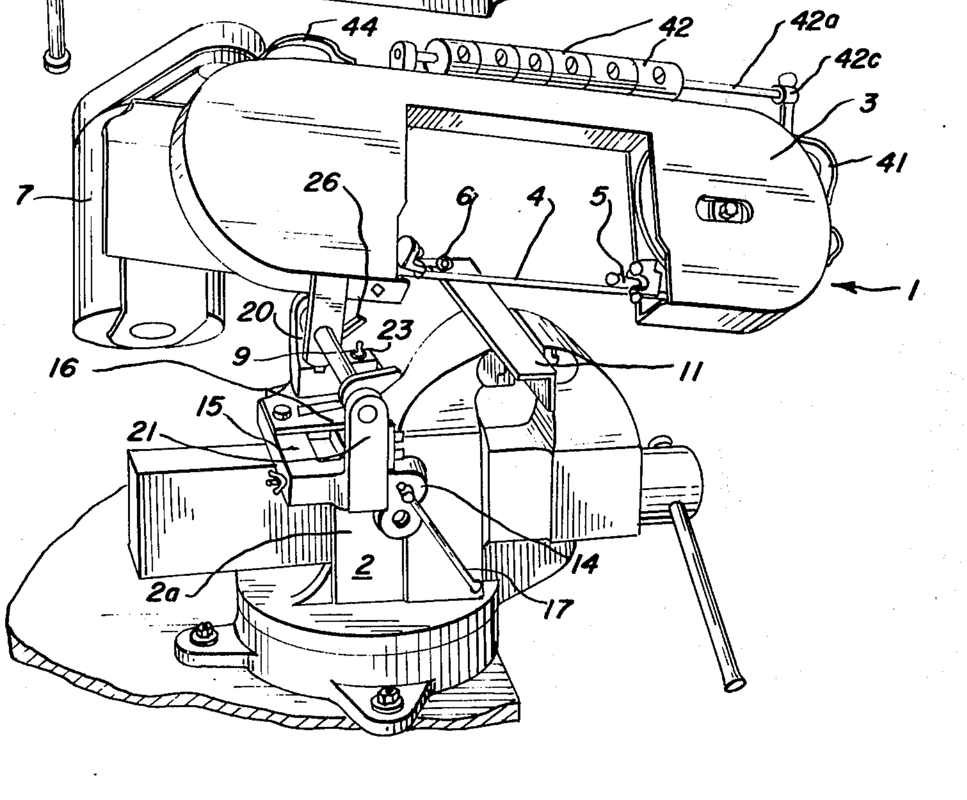
FIG. 2 illustrates the band saw in the horizontal cutting position.

In FIG. 2, the band saw 1 is in a tilted position as it would be when engaging the workpiece 11 which is held by the vice 2. The jaws of vice 2 may be operated to hold or release the workpiece 11 without interfering with the mounting or positioning of the band saw 1. In the horizontal cutting position, the band saw 1 connected to mounting assembly 8 and in turn to shaft 9 has been moved forward by the rotation of the shaft 9 and will cut through the workpiece 11 due to the weight of the band saw itself. However, if an adjustment of the blade force on the work is necessary, the balance weights 42 can be adjusted on the supporting shaft 42*a* and held in place by set screws 42*b* which are threaded in the weight and engage the shaft. The balance weights 42 are mounted on shaft 42*a* which is in turn mounted on the C-shaped frame 3 by any conventional bracket type assembly 42*c*. The details of the clamping structure 10 will be described with reference to FIG. 3 wherein like numbers represent the same parts as illustrated in FIGS. 1 and 2.

Figure 3:
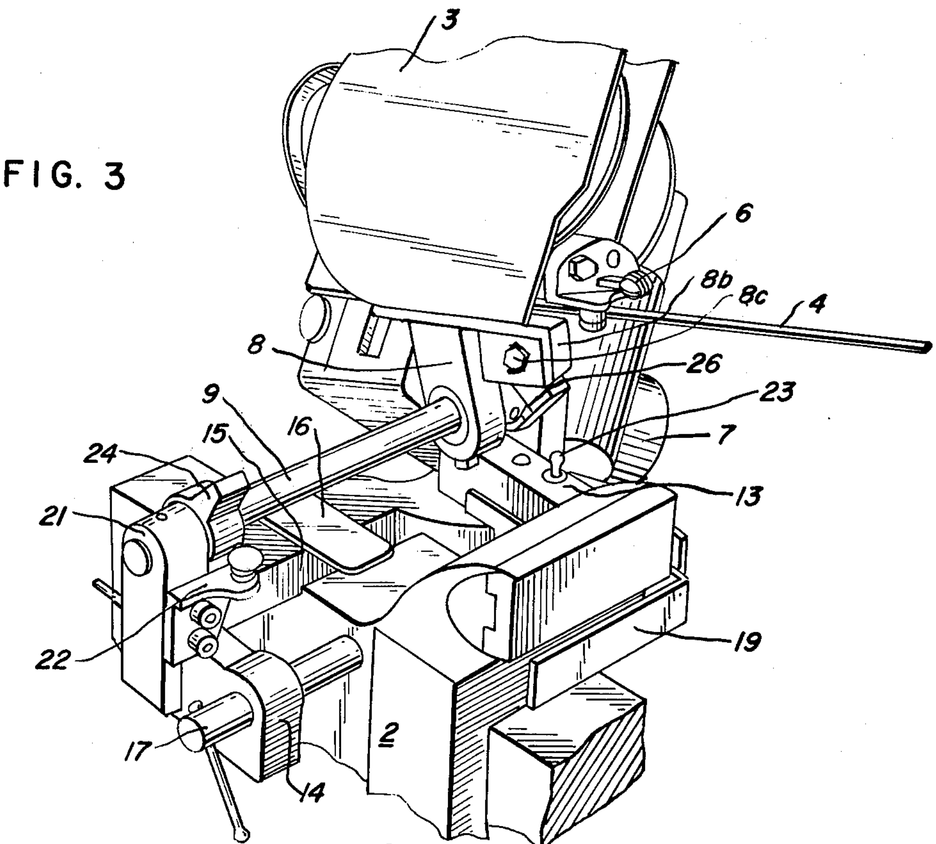
FIG. 3 illustrates the details of the clamp structure which mounts the band saw on the vice.

The clamping structure 10 illustrated at FIG. 3 consists basically of the C-shaped bracket 12. The C-shaped bracket 12 comprises an inside arm 13, an outside arm 14 and a connecting cross bar or bight 15. The inside arm 13 engages the inside, generally vertical face of the fixed frame and jaw 2*a* of vice frame 2. The second or outside arm 14 is spaced from the outside edge of vice frame 2*a*. Through a threaded hole in the outside arm 14, a tightening screw 17 is placed which engages frame 2*a*. Midway along the length of the cross bar 15 is mounted tongue-shaped stabilizing member 16 which prevents excess forward rotation. In the inside arm 13, there is an elongated slot 18 (best shown in FIG. 6). An L-shaped bracket 19 is secured to the inside arm 13 and is movable along the length of the elongated slot 18. The bracket 19 is adjusted by movement along slot 18 until the clamp structure 10 is securely attached to the vice 2. The bracket 19 has a threaded hole which receives lock bolt 19*a* through slot 18 and increases the stability of the entire band saw during operation in either the tilting or table mode by preventing movement of the saw relative to the vice. The basic elements of the clamping structure 10 are positioned relative to the non-movable jaw of a standard work shop vice 2 and a set screw 17*a* threaded in inside arm 13 by tightening screw 17.

At the point where the cross bar 15 joins both the inside arm 13 and the outside arm 14, two vertical posts 20 and 21 are connected respectively to the inside and outside arms. It should be noted that the posts 20 and 21 have trunnions which support shaft 9 for rotation and may be integral with the C-shaped bracket 12. The shaft 9 passes through the vertical posts 20 and 21. Midway up the vertical post 21 there is positioned a stop 22. The stop 22 is a horizontal projection which extends toward the vertical post 20. Positioned along the inside arm 13 is a safety on-off switch 23. Mounted on the shaft 9 next to vertical post 21 is a stop bushing 24 which moves forward when the shaft 9 rotates. Mounted on the stop arm 22 is a stop spring means 25.

As the band saw frame 3 is moved towards the horizontal cutting position as illustrated in FIG. 2 bringing the cutting band 4 into contact with the workpiece 11, the shaft 9 rotates clockwise in FIG. 3. The entire band saw 1 and mounting 12 are prevented from tipping while cutting in the horizontal position by the tongue member 16 which gives stability to the band saw. The tongue member 16 contacts the vice 2 and since it is connected to the cross bar 15, it acts to prevent the cross bar 15 from rotating in unison with band saw 1. As the band saw cuts through the workpiece 11, the lever arm 26 (best illustrated in FIG. 2) will rotate and finally engage the safety on-off switch 23 when the entire band saw has reached a downward position with the blade 4 completely through the workpiece 11. To prevent the band saw from moving beyond a predetermined angular position in the downward direction, the stop bushing 24 which rides on the shaft 9 will engage the stop spring means 25 mounted on stop arm 22. When the stop bushing 24 contacts the stop spring means 25 which is mounted on the horizontal stop arm 22, the entire weight of the band saw 1 can be supported and therefore, further downward movement prohibited.

FIG. 4 illustrates the band saw 1 in the vertical cutting position with detachable table or work surface 30. The table 30 is provided with a substantially V-shaped notch 31 which conforms to the shape of the longitudinal portion of the C-shaped frame 3 of the band saw. The removable table 30 also has an elongated channel 32 beginning on the same side of the table 30 as the V-shaped notch 31 and extending approximately one-third of the way toward the exactly opposite side of the table. The cutting band or saw blade will pass through an innermost portion of the channel 32. In the table saw arrangement as illustrated in FIG. 4, the workpiece 11a is brought to the band saw's cutting blade 4 rather than bringing the band saw to the workpiece as is necessary for the horizontal cutting or tilting operation. On the underside of the removable table 30, near the two corners remote from notch 31 are mounted leg type appendages 34 and 35. A third generally vertical leg 33 extends downwardly and is fastened to outside arm 14 with a winged bolt (not shown) or the like. This arrangement eliminates the need for any additional hardware to support the work table 30 or the saw when vertical operation is desired. Obviously when the band saw 1 is operated in the vertical mode, the stop spring means 25 and the safety on-off switch 23 are not used. This table supporting function is the second feature of the dual clamping structure 10 and is described in detail hereinafter.

Figure 5:
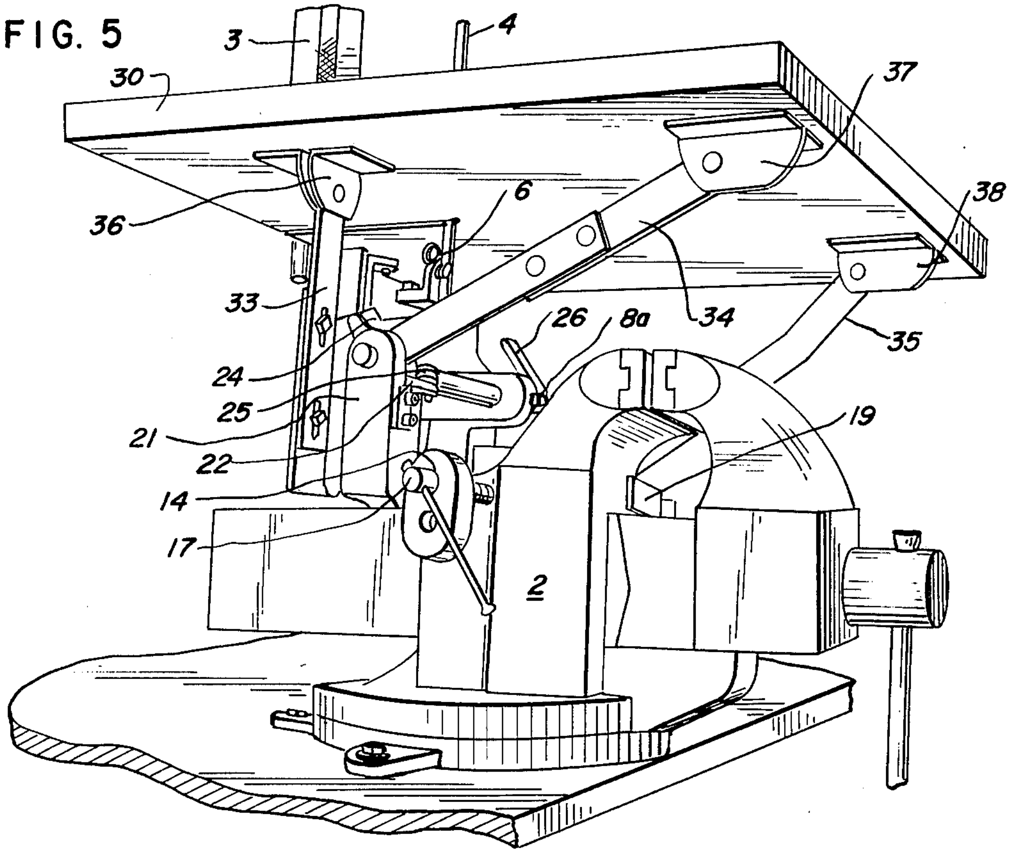
FIGS. 5 and 6 illustrate the mounting positions on the clamping structure of the removable table.

FIG. 5 illustrates the proper connections for the legs 33 and 34 and 35 to the underside of detachable table 30 and the mounting connections of the legs to the clamp structure 10. The three support legs 33, 34 and 35 are pivotally attached to the underside of table 30 by brackets 36, 37 and 38. The legs 33, 34 and 35 are collapsible to fit as flush as possible against table 30 for storage, in much the same manner as folding legs of a card table. Each leg is secured to the clamping structure 10 at an appropriate point.

As leg 33 extends almost vertically downward from table 30 and contacts the clamping frame 10 at the arm 14 of the C-shaped bracket 12 directly to the rear of the vertical post 21 it provides a stable self-equalizing suspension of table 30. The leg 34 extends downward and rearward until it contacts the shaft 9 at a point between the vertical post 21 and the stop bushing 24. Again the connection may be made in any known manner such as having the end of leg 34 be cup-shaped to fit partially around the shaft 9.

Figure 6:
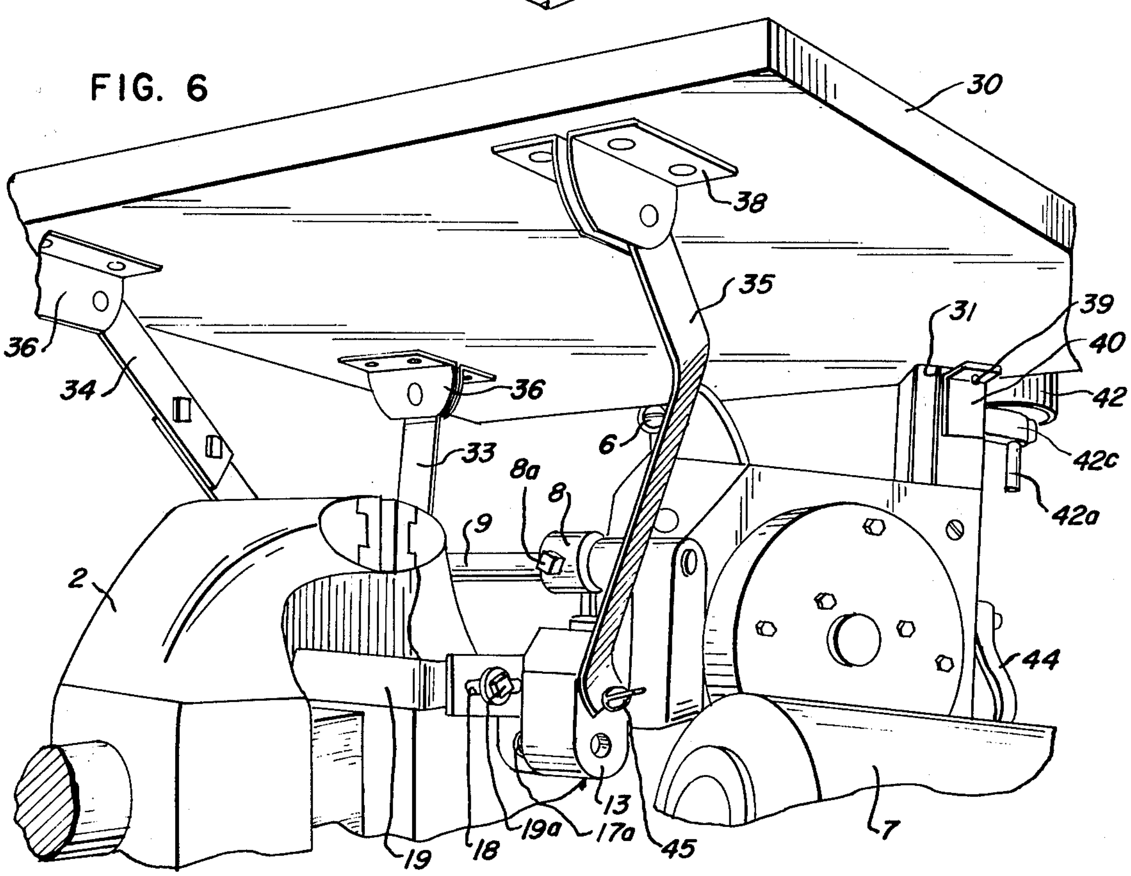

FIG. 6 illustrates the third leg 35 which is pivotally connected to bracket 38. The leg 34 extends downward and rearward both laterally and vertically until it contacts a portion of the inner arm 13 of the C-shaped bracket 12. At the point of contact attachment is made by any well-known means such as the screw and wing nut assembly 45. Near the only remaining corner of the table 30 and the notch 31 a cylindrical projection 39 extends downward from the table. Mounted on the C-shaped frame 3 of the band saw 1 is an L-shaped bracket 40. The bracket 40 has a hole positioned therein so that the projection 39 mates with bracket 40. Thus, the table 30 is properly aligned by the connection of the projection 39 with the bracket 40 while the table 30 is completely supported by the legs 33, 34 and 35. The clamp frame 10 is the only supporting structure for the table 30 and this makes the entire band saw 1 compact and portable. It should be noted that the table 30 is mounted at each point by easily connectable assemblies which render the use of the band saw 1 in the table mode easy to set up.

To operate the band saw 1 in the horizontal or tilting mode as illustrated in FIG. 2, the workpiece 11 is secured at the desired position in the jaws of the vice 2. The band saw 1 is held by forward handle 41 and moved downward until the blade 4 makes contact with the workpiece 11. The weight of the band saw 1 usually provides sufficient force to cut through the workpiece 11. However, if additional force is desired, the balance 42 can be adjusted by shifting the weights on shaft **42*a* and setting screws 42*b*. In the table or vertical operational mode as illustrated in FIG. 4, the band saw is first moved to the upright position. Next, the table 30 is connected to the various points described above. Now, the workpiece 11 can be rested upon the table 30 and brought into contact with the blade 4**.

Additionally the entire band saw 1 can be held by the handles 41 and 44 without any clamping structure 10. In this last mode the vice 2 is not necessary since the band saw is completely hand held. The saw 1 may be disconnected from the mounting structure 8 by forming the trunnion separately and securing it to the saw housing **8*b* as by a fastening bolt 8*c*** or the like.

It is to be understood that the present disclosure can be modified or varied by applying current knowledge without departing from the spirit and scope of the novel concepts of the invention.

I claim:

1. A multiple position band saw device for mounting on the fixed jaw portion of a bench vice comprising
- a band saw with driving motor, and
- clamping means for mounting said band saw on the fixed jaw portion of said vice comprising,
- a substantially C-shaped section,
- a tongue means attached to the bight portion of said C-shaped section and extending toward the fixed jaw of said vice for stabilizing said band saw during horizontal cutting,
- an adjustable L-shaped section movably attached to one of the arms of said C-shaped section for engaging said vice adjacent said fixed jaw to stabilize said band saw,
- a shaft secured to and extending the length of the bight portion of said C-shaped section for rotatably carrying said band saw; and a work surface for use when the band saw is in the vertical position comprising,
- a table, and
- at least three leg members connecting three spaced points on said table only to said clamping means.

2. A band saw as set forth in claim 1 further including
- a bracket mounted to said band saw,
- an alignment projection extending downward from said table for engagement with said bracket.

3. The band saw of claim 1 wherein said leg members are pivotally mounted on said table to facilitate storage thereof.

* * * * *